Figure 1:
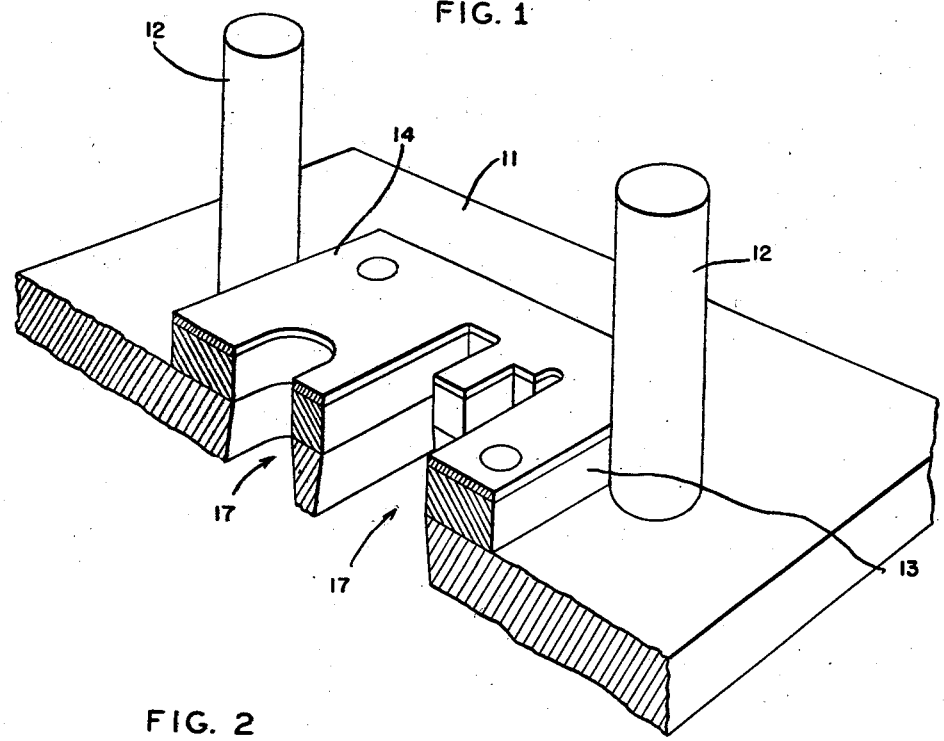

July 13, 1943.   A. E. VOSBURG   2,323,949
PROCESS OF MAKING DIES
Filed Aug. 16, 1940

INVENTOR.
ALAN E. VOSBURG
BY
ATTORNEY.

Patented July 13, 1943

UNITED STATES PATENT OFFICE 2,323,949

PROCESS OF MAKING DIES

Alan E. Vosburg, Chicago, Ill., assignor to Teletype Corporation, Chicago, Ill., a corporation of Delaware Application August 16, 1940, Serial No. 352,882

12 Claims. (Cl. 76—107)

The present invention relates to methods of manufacturing blanking dies and particularly those of laminated or composite die plates.

In order to assure sharp, well-defined punch press production, it is of prime importance that dies be made to conform accurately in all detail to the outline of their associated punch. Even slight discrepancies from this rule tend to produce ragged formations and overhanging rims, results which subsequently require additional processing and therefore increased cost of finishing. To avoid such consequences, the fitting of dies to their associated punch element is customarily a tedious and painstaking toolmaker's task. Where punch and die sets entail intricate or involved outline, the fitting operations are correspondingly involved and costly, and where the contemplated production of parts is limited, the expense of manufacturing blanking dies frequently constitutes a prohibitive factor.

The cost of manufacturing a die more frequently exceeds that of manufacturing its associated punch. This fact is true largely because of the more difficult accessibility to internal angles and inside curves, whereas punch blocks for the most part present outside curves and open angles whose surfaces are more easily attained by the toolmaker's tools. The improvement herewith proposed concerns a simplified and labor reducing method of manufacturing dies after the punch has been completed in accordance with conventional production methods, so that the cost of punch and die assemblies may thereby be greatly diminished.

Accordingly, the principal object of the present invention is the provision of a method for manufacturing dies and die blocks adopted for use in simple and progressive blanking operations whereby the processes of pattern outlining, profiling, and roughing-out may be obtained with minimum cost while yet affording sharply defining die outlines which conform faithfully to those of their associated punch elements.

Briefly described, the present improved method of manufacturing blanking dies involves the use of a composite metal plate as a material from which the die is shaped. Consequently, a thin sheet of tool steel metal is placed upon a relatively heavy plate of soft iron material, such as cold rolled stock, for the purpose of obtaining a hard cutting or shearing edge at the surface where the die encounters the punch and a relatively ductile but tougher body throughout the remaining thickness of the assembly, thereby not only diminishing from the original expense of material, since soft stock is generally known to be of less expense, but also there is obtained in this manner a composite characteristic of hardness and toughness that enables a die plate manufactured in this manner to withstand many strains more effectively than may be expected of a die plate which is formed throughout of hard steel.

In accordance with a preferable method of processing, it is proposed to outline roughly the approximate area which is to be cut away in the ultimate formation of the die. This area on the backing plate is then thoroughly honeycombed with transverse perforations placed closely together for the purpose of thereby removing a substantial portion of the metal body and for thereby affording greater compressibility in the areas to be subsequently dented and cut away. Thereafter, the two plates which are to constitute the die are assembled, fitted onto the supporting shoe or punch press bed, as the case may be, and the punch brought forcibly into engagement with the outer surface of the hard steel die plate after the manner of conventional punch press operation. In this way the protruding portions of the punch are forced through the die plate, the backing plate yielding accordingly as augmented by the prepared perforations. When the work contemplated is light, that is, when the striking is from thin stock, the thin die may be made of even thinner stock than otherwise and also the backing plate may be of softer material. This affords a convenience of not having to honeycomb the punch receiving areas of the backing plate but instead a direct application of the compression stroke which effects compression of the backing plate metal without the necessity of special relief to the lateral flow of metal.

The completion of the die is then advanced by dismantling the die assembly and profiling or sawing out the depressed portion of the backing plate which operation, in accordance with the previously prepared indentation outline, may be executed with but ordinary attention to detail as compared with extreme attention required under conventional forms of die manufacture.

Figure 2:
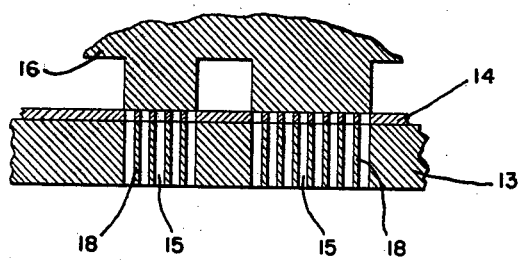
Figure 3:
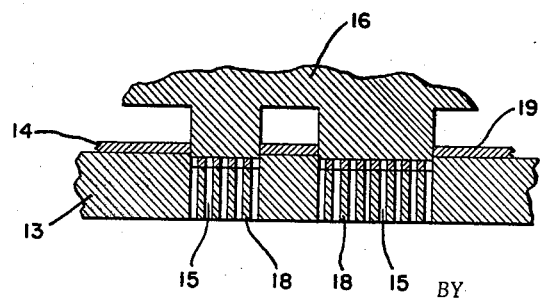

For a more comprehensive understanding of the present invention, reference may be had to the detailed description of the process following hereinafter and to the accompanying drawing in which corresponding reference characters designate similar parts throughout; and in which Fig. 1 is a perspective view of a dismantled die plate and supporting shoe, a transverse section of which has been cut away;

Fig. 2 is a transverse sectional view through the punch and die assemblies illustrating the members brought together and before penetration has been effected; and Fig. 3 is a view similar to Fig. 2 but illustrating the punch as having penetrated through the thin die plate and as having compressed the backing plate under typically illustrative conditions of operation.

Referring now particularly to the drawing, attention is directed to the reference character 11 which denotes a die holder. This member customarily is formed of a heavy plate of steel whose face surfaces, top and bottom, are each ground to a true plane and which surfaces are parallel to each other. Customarily, die holders, such as the one indicated 11, are provided with two or more guide pins or posts 12 which are securely anchored in the holder 11 and which extend perpendicularly from the top plane surface thereof. The guide pins or posts 12 afford a means for directing the course of the punch holder which may be a generally similar element except for having holes to snugly receive the guide posts 12.

In Fig. 1, this assembly is indicated as a composite structure consisting of the backing plate 13 and the shearing plate or die member proper 14. The composite member 13—14 is provided with dowels, as shown, or with any other locating means for assuring the maintenance of their association in exact and constant interrelationship, as well as the relationship of the composite assembly with the die holder or shoe. In this manner, the die is located permanently with respect to the punch holder and the assembly is now in readiness for the next procedure of steps in the preparation which consists of drilling the perforations 15 within the area which is to be cut away.

In order to locate the honeycombing drill holes properly and to make certain that they are confined within the proper areas, the punch block 16 may be brought down to rest position upon the die plate 14 and the outline of the punch scribed upon the surface of the die plate 14 or otherwise indicated thereon.

It is to be noted that, here, as in accordance with the conventional practice, die holder 11 is ultimately cut away as indicated at 17, Fig. 1, in downwardly flaring openings in order to provide ample clearance for releasing the piece parts subsequent to punch press operation. This clearance also will conform generally to the contour of the punch block 16 and particularly to its engaging or protruding punch portion.

After the punch 16 has been securely fitted into the punch holder, which operation preferably precedes the location of the die plate in the die holder, the elements are in readiness for the location of the holes 15 in the die plate 14 and its backing plate 13, as aforedescribed. The area or areas covered by the punch is then indicated upon the surface of the die plate 14 following which the assembly is dismantled for the purpose of drilling the holes 15 which extend through said plate 14 and its backing plate 13 and which holes are located as close together as is reasonably consistent with the compressibility of the metal from which the backing plate 13 is constructed, and consistent also with the practicability of drilling the holes 15 by means of ordinary holding and drilling apparatus.

While it has been suggested that the perforations 15 may extend through the hard tool steel plate 14 as well as its backing plate 13, it is to be borne in mind that this suggestion is predicated upon the practicability of locating the areas to be cut away and in order to save having to separate said plate 14 from its backing plate 13 after the two laminations have become integrally associated. Where the plate 14 is not to be permanently secured to the backing plate 13 preparatory to the drilling operation, an equally feasible procedure may be one in which the perforations 15 extend through the backing plate 13 only and not through the tool steel face plate 14 as aforedescribed. This alternative procedure is suggested since, as has been said, it is the purpose of the perforations 15 to afford space wherein the adjacent backing plate metal may be permitted to flow during compression, as will be described later. The tool steel plate 14, on account of its noncompressible characteristic is presumed to undergo no distortion or flowing as is contemplated for the backing plate 13.

After the prospective cutaway areas have been perforated or honeycombed throughout, as indicated above, the processing punch press operation preparatory to the completion of the tool may be undertaken for which it is understood that the plates 14 and 13 will be reinstalled into their exact located positions as determined by the posts 12, and following which the punch 16 is permitted to descend forcibly. In order to insure that the backing plate 13 may not become distorted on account of the compression which is induced by the punch 16 during the described forcible operation, it may be preferred to support said backing plates 13 as by the use of a solid die holder plate 11, or it may be desired to postpone the cutting out of openings 17 in said die holder 11 until after the aforedescribed punch press operation has been consummated. The extent of travel of the punch 16 with respect to the composite plate 13—14, need not exceed that distance which is necessary in order to sever the cutout portions of hardenable die plate 14. This will leave a surface indentation in the backing plate with a definite marginal outline to serve as a guide to the cutting operator. An approximation of such a condition has been illustrated in Fig. 3 where there is indicated also, by a reduction in the size of the apertures or holes 15 and a corresponding enlargement of the thickness of the intervening wall sections, that as a result of the compression which is effected in plate 13, the metal of the intervening wall sections 18 is permitted to expand by reason of the space afforded on account of the perforations 15, which expansion would otherwise not so practicably obtain. This phenomenon has been described as a flowing of the metal of plate 13 induced by the compressive force imparted by punch 16. Of course, where the plate 13 is constructed of a metal whose characteristics of compressibility are greater than are those of mild or cold rolled steel, this degree of compression may possibly be absorbed within the solid metal without having to provide the openings 15, as aforedescribed. If the backing plate is inherently too compressible, it has been found to yield too freely beneath adjacent areas which are not to be cut away especially when such areas are of small, narrow, or of intricate outline. Experiment has proved that ideal die making conditions are obtained where the compressibility of the backing plate 13 is of such a physical characteristic as to offer too much resistance to the compression stroke unless the openings 15 are provided in order to afford avenues of escape for the flowing metal.

After the thin die plate 14 has been sheared or blanked out in accordance with the aforedescribed procedure, the punch holder and its integrally associated punch 16 are withdrawn, the die 14 is removed for the purpose of hardening, and the backing plate 13 is removed for the purpose of sawing away or profiling that portion of its metal which has been indented as a result of the compression operation. After the finishing operations have been performed upon the die plate 14 as well as upon the backing plate 13, the die is reassembled and appears as illustrated sectionally in Fig. 1. It is to be noted that in accordance with a preferred method of performing the compression, the punch 16 is permitted to descend below the top surface of backing plate 13, as indicated at 19, Fig. 3. Accordingly, there will be formed a continuous outline which may serve handily as a guide in the execution of the profiling operation. This outline serving as a profiling index has, it has been found, materially reduced the amount of time required by the toolmaker in removing the blanked out portion of the die as against the time required in accordance with conventional procedure.

While the present invention has been described in contemplation of a specific method and sequence of operations, it is to be understood nevertheless that consistent with the teachings herein disclosed, numerous modifications and variations may be incorporated without departing from the spirit or scope thereof. Accordingly, it is not intended to be limited by the specific language of the foregoing detailed description nor by the particulars of the accompanying drawing, except as indicated in the hereunto appended claims.

What is claimed is:

1. A method of processing blanking dies which consists in, assembling a composite die plate comprised of a sheet of tool metal and a sheet of compressible metal, marking upon the surface of said composite plate the area proposed for removal to conform with a punch, perforating said area with a plurality of closely located holes, indenting said area with a punch, and removing the indented area by following with a cutting tool the outline made by said punch.

2. A method of manufacturing blanking dies consisting in the steps of, compositing a die plate of a plurality of sheet laminations consisting of hardenable tool steel and compressible metal laminations, presenting said composite plate into co-operating relation with a punch, outlining on the surface of said composite plate the area corresponding to the punch, drilling in said area a plurality of closely placed perforations, indenting said composite plate area thus perforated by forcible application of the punch, and removing the metal indented by said punch.

3. A method of manufacturing blanking dies which consists in the steps of overlaying a lamination of tool steel upon a lamination of ductile steel, presenting said laminations into co-operative relation with a punch, producing upon a surface of said laminations the punch outline, weakening the area within the outline of the punch, indenting said areas by forcibly applying said punch, and then removing the indented portions of said tool and ductile steel laminations.

4. A process of manufacturing die plates for punch and die blanking assemblies which consists in the steps of compositing a die blank from a plurality of laminations including one lamination of thin tool steel stock, compressing by means of a punch to be utilized with the die the area to be removed from said die blank, and profiling the die in accordance with the outline made by said punch compression.

5. A method of making blanking dies of a plurality of sheets of metal, at least one of said sheets having die tool characteristics, which consists in honeycombing the areas of said sheets which correspond to a blanking punch, forcing the punch against said plurality of sheets to effect a limited indentation within said honeycombed areas, removing indented metal areas, and profiling under guidance of the depression outline.

6. A method of constructing blanking dies which consists in the steps of assembling a plurality of metallic sheets at least one of which is composed of tool metal, honeycombing portions of the sheets corresponding to punch receiving apertures, depressing said portions and causing the metal to flow into space provided by said honeycombing by forcible application of the punch to be associated with the die, and removing the depressed metal and honeycombed area by sawing out in accordance with the outline provided by said depression.

7. A method of manufacturing blanking dies consisting in the steps of, compositing a die plate of a plurality of laminations consisting of tool metal and compressible metal, presenting said composite plate into blanking relation with a punch, outlining on the surface of said composite plate the area corresponding to the punch, honeycombing said area, indenting said composite plate area thus perforated by forcible application of the punch, and removing the metal indented by said punch.

8. A method of manufacturing blanking dies which consists in the steps of compositing a lamination of tool hardenable metal with a lamination of ductile metal into a die plate assembly, presenting said assembly into blanking relation with a punch, enscribing the punch element outline upon the surface of said assembly, honeycombing the outlined area of said assembly, indenting said areas by forcibly applying said punch, then removing the indented portions of said composite plate.

9. The process of forming die plates which consists in the steps of stacking a plurality of laminations including one lamination of thin tool steel stock, honeycombing the area thereof to be removed for punch reception, compressing the area by forcibly applying a punch against said die plate, and profiling the die in accordance with the outline made by said compression.

10. A method of making dies from a composition of sheets which consists in honeycombing punch receiving areas thereof, forcing a punch against said plurality of sheets to effect an outline indentation within said honeycombed areas, and sawing out the indented metal areas.

11. A method of manufacturing composite dies which consists in overlaying a thin plate of tool steel upon a softer metal backing plate, honeycombing the area in said backing plate to be cut out for punch co-operation, blanking said thin plate and denting said backing plate by means of a punch operation, and thereby forcing the backing plate metal to flow into the honeycombed space accommodation, and removing the compressed metal.

12. A method of manufacturing blanking dies which includes the steps of overlaying a plate of tool steel upon a backing material thereby to form a die assembly, producing upon a surface of said assembly an outline of a punch to be used with said assembly, weakening the area circumscribed by said outline to render it collapsible to a compression force, and then forcibly applying the punch to said weakened area to indent and compress said weakened area below the plane of said surface.

ALAN E. VOSBURG.